(12) United States Patent
Wyatt et al.

(10) Patent No.: US 10,193,988 B2
(45) Date of Patent: Jan. 29, 2019

(54) SETTING A FIRST-PARTY USER ID COOKIE ON A WEB SERVERS DOMAIN

(71) Applicant: Criteo, SA, Paris (FR)

(72) Inventors: Patrick Wyatt, London (GB); Cédric Roux, Paris (FR); Bruno Roggeri, Paris (FR)

(73) Assignee: Criteo SA, Paris (FR)

( * ) Notice: Subject to any disclaimer, the term of this patent is extended or adjusted under 35 U.S.C. 154(b) by 325 days.

(21) Appl. No.: 14/934,637

(22) Filed: Nov. 6, 2015

(65) Prior Publication Data

US 2017/0134512 A1 May 11, 2017

(51) Int. Cl.
*H04L 29/08* (2006.01)

(52) U.S. Cl.
CPC .............. *H04L 67/22* (2013.01); *H04L 67/02* (2013.01); *H04L 67/20* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 2006/0150253 A1 | 7/2006 | Feuerstein et al. | |
| 2007/0168506 A1 | 7/2007 | Douglas et al. | |
| 2009/0024737 A1 | 1/2009 | Goldspink et al. | |
| 2009/0172091 A1 | 7/2009 | Hamel | |
| 2010/0094704 A1 | 4/2010 | Subramanian et al. | |
| 2011/0125595 A1 | 5/2011 | Neal et al. | |
| 2011/0185016 A1 | 7/2011 | Kandasamy et al. | |
| 2011/0225637 A1 | 9/2011 | Counterman | |
| 2012/0022942 A1 | 1/2012 | Holloway et al. | |
| 2012/0023547 A1 | 1/2012 | Maxson et al. | |
| 2012/0297062 A1 | 11/2012 | Lu et al. | |
| 2013/0145022 A1 | 6/2013 | Srivastava et al. | |
| 2013/0275195 A1 | 10/2013 | Gabryelski et al. | |
| 2013/0339139 A1* | 12/2013 | Meyers ............... | G06Q 30/0275 705/14.49 |
| 2014/0164111 A1* | 6/2014 | Rodriguez ......... | G06Q 30/0255 705/14.53 |
| 2014/0180829 A1* | 6/2014 | Umeda ............... | G06Q 30/0273 705/14.69 |
| 2014/0223462 A1* | 8/2014 | Aimone ........... | H04N 21/42201 725/10 |
| 2014/0316902 A1* | 10/2014 | Le Jouan ........... | G06Q 30/0269 705/14.66 |
| 2014/0365304 A1 | 12/2014 | Showers et al. | |

(Continued)

*Primary Examiner* — Azizul Choudhury
(74) *Attorney, Agent, or Firm* — Proskauer Rose LLP (57) ABSTRACT

Methods and systems for setting first-party cookies are disclosed. A first request for a first webpage is sent by a user device to a first web server on a first domain. The first webpage includes first ad system call instructions. The first ad system call instructions are executed to send a second request to an ad system on a second domain to initiate determining a supply side platform (SSP) user ID. First SSP call instructions are received by the user device. The first SSP call instructions are executed to send a third request to an SSP server on a third domain. Second ad system call instructions including the SSP user ID are received by the user device. The second ad system call instructions are executed to send a fourth request comprising the SSP user ID to the ad system. First storing instructions for the SSP user ID are received.

18 Claims, 4 Drawing Sheets

(56) References Cited

U.S. PATENT DOCUMENTS

| | | | |
|---|---|---|---|
| 2015/0051968 A1* | 2/2015 | Sotelo | G06Q 30/0277 705/14.45 |
| 2015/0058141 A1* | 2/2015 | Yablonka | H04L 63/0227 705/14.73 |
| 2015/0082345 A1* | 3/2015 | Archer | H04L 65/605 725/34 |
| 2015/0134459 A1 | 5/2015 | Dipaola | |
| 2015/0154650 A1* | 6/2015 | Umeda | G06Q 30/0273 705/14.68 |
| 2015/0181311 A1* | 6/2015 | Navin | H04N 21/812 725/34 |
| 2015/0324857 A1 | 11/2015 | Siegel et al. | |
| 2015/0379554 A1 | 12/2015 | Copeland | |
| 2016/0098765 A1* | 4/2016 | Ishida | G06Q 30/0241 705/14.71 |
| 2016/0125471 A1 | 5/2016 | Hsu | |
| 2016/0182657 A1 | 6/2016 | Mukherjee | |
| 2016/0234203 A1 | 8/2016 | Gatto | |

* cited by examiner

SETTING A FIRST-PARTY USER ID COOKIE
ON A WEB SERVERS DOMAIN

FIELD OF THE TECHNOLOGY

The present technology relates generally to setting cookies and, more specifically, to setting a first-party user identification (ID) cookie on an ad-server's domain.

BACKGROUND

Online and other electronic advertising allows advertisers to display advertisements (or ads) to users, including those who are potential customers. For example, a publisher webpage can include one or more opportunities for inserting advertisements from third-party advertisers (e.g., space for a banner advertisement across the top of the webpage, spaces for advertisements along the sides of the webpage, native ads, overlays, etc.). When a user device (e.g., a computer running a web browser) processes a webpage for display, the user device can request an advertisement for one of the advertising opportunities on the webpage from an ad system. The ad system can select an advertisement for display within the area of the webpage associated with the advertising opportunity. For example, the ad system can select, based on information about the user, a banner ad from a particular advertiser from a set of multiple banner ads from multiple advertisers for display to the user in the banner ad space of the webpage. In some applications, ad systems can set cookies on user devices to track user behavior and facilitate determining the most relevant ad to display to the user.

Some web browsers do not allow third-party cookies, which can block ad systems from setting cookies on their own domains. As an example, a browser on a user device visits abc.com in response to a user entering "www.abc.com" into the address field of the browser, and the browser can request a webpage from the web server on abc.com. The web server on abc.com can return a webpage to the browser, along with cookie data to be set as a cookie on the domain "abc.com." The cookie data from abc.com can be referred to as a first-party cookie, and many browsers will store the data as a cookie on the abc.com domain. The webpage source can include references to resources on other domains, such as an HTML image tag with a source address on another domain, e.g., xyz.com. The browser can request the image from a server on xyz.com and the server on xyz.com can return the requested image to the browser, along with data to set as a cookie on the domain "xyz.com." The cookie data from xyz.com can be referred to as a third-party cookie. If the browser is configured to block third-party cookies, the browser will not store the data in a cookie on the xyz.com domain, until the user explicitly navigates to the xyz.com domain, e.g. by clicking on a link pointing to that domain.

As noted above, some ad systems provide data to user devices (e.g., data that when provided back to the ad system allows the ad system to identify the user devices) for storage as cookies. However, some web browsers do not permit setting third-party cookies, and require the user to visit the ad system's domain directly (e.g., by typing the ad system's URL into the address bar) for the ad system to set a cookie on the ad system's domain.

SUMMARY

Accordingly, there is a need for setting a first-party cookie, which contains information that can be used by the ad system to identify the user, in a browser that blocks third-party cookies. The technology described herein can facilitate tracking the user behavior until a first-party cookie can be set on the ad system domain, and eventually a party setting a cookie as a first-party cookie on the ad system domain.

In one aspect, there is a method performed by a user device. The method includes sending, by the user device, to a first web server on a first domain, a first request for a first webpage. The method includes receiving, by the user device, from the first web server, the first webpage including first ad system call instructions. The method includes executing, by the user device, the first ad system call instructions to send a second request to an ad system on a second domain to initiate determining a supply side platform (SSP) user ID. The method includes receiving, by the user device, from the ad system, first SSP call instructions. The method includes executing, by the user device, the first SSP call instructions to send a third request to an SSP server on a third domain. The method includes receiving, by the user device, from the SSP server, second ad system call instructions, the second ad system call instructions including the SSP user ID. The method includes executing, by the user device, the second ad system call instructions to send a fourth request including the SSP user ID to the ad system. The method includes receiving, by the user device, from the ad system, first storing instructions including the SSP user ID. The method includes executing, by the user device, the first storing instructions to store the SSP user ID in a first browser cookie associated with the first domain.

In some embodiments, the third request includes at least one of an SSP browser cookie including the SSP user ID and fingerprint data associated with the user device. In some embodiments, the method can include sending, by the user device, a first ad request for a first ad, the first ad request including the SSP user ID; receiving, by the user device, a first ad including a target URL on the second domain; in response to a user interaction with the first ad, sending, by the user device, a fifth request for a resource associated with the URL to the ad system on the second domain; receiving, by the user device, from the ad system, second storing instructions including an ad system user ID associated with the SSP user ID; and executing, by the user device, the second storing instructions to store the ad system user ID in an ad system browser cookie associated with the second domain.

In some embodiments, the ad system browser cookie is a first-party browser cookie associated with the second domain. In some embodiments, the method includes sending, by the user device, to the first web server on the first domain, a sixth request for a second webpage; receiving, by the user device, from the first web server, the second webpage including third ad system call instructions; and executing, by the user device, the third ad system call instructions to send a seventh request to the ad system on the second domain, the seventh request including the ad system user ID.

In some embodiments, the method includes sending, by the user device, to the first web server on the first domain, a fifth request for a second webpage; receiving, by the user device, from the first web server, the second webpage including third ad system call instructions; and executing, by the user device, the third ad system call instructions to send a sixth request to the ad system on the second domain, the sixth request including the SSP user ID.

In another aspect, there is a method performed by a computing system. The method includes sending, by a user device, to a first web server on a first domain, a first request for a first webpage. The method includes sending, by the first web server, to the user device, the first webpage including first ad system call instructions. The method includes executing, by the user device, the first ad system call instructions to send a second request to an ad system on a second domain to initiate determining a supply side platform (SSP) user ID. The method includes determining, by the ad system, based on the second request, the user device does not store a pre-existing ad system user ID and does not store a pre-existing SSP user ID. The method includes sending, by the ad system, to the user device, first SSP call instructions. The method includes executing, by the user device, the first SSP call instructions to send a third request to an SSP server on a third domain. The method includes sending, by the SSP server, to the user device, second ad system call instructions, the second ad system call instructions including the SSP user ID. The method includes executing, by the user device, the second ad system call instructions to send a fourth request to the ad system, the fourth request including the SSP user ID. The method includes determining, by the ad system, an ad system user ID associated with the SSP user ID. The method includes sending, by the ad system, to the user device, storing instructions including the SSP user ID. The method includes executing, by the user device, the storing instructions to store the SSP user ID in a first browser cookie associated with the first domain.

In some embodiments, the third request includes at least one of an SSP browser cookie including the SSP user ID and fingerprint data associated with the user device. In some embodiments, determining, by the ad system, the ad system user ID includes generating, by the ad system, an ad system user ID; and associating, by the ad system, the ad system user ID with the SSP user ID. In some embodiments, determining, by the ad system, an ad system user ID includes retrieving, by the ad system, an associated ad system user ID associated with the SSP user ID.

In some embodiments, the fourth request further includes one or more user behavior events, the method further includes associating, by the ad system, the one or more user behavior events with the ad system user ID associated with the SSP user ID. In some embodiments, the method includes sending, by the user device, a first ad request for a first ad, the first ad request including the SSP user ID; and receiving, by the user device, a first ad including a target URL on the second domain. In some embodiments, the ad system selects the first ad based on a plurality of user behavior events associated with the ad system user ID. In some embodiments, in response to an interaction with the first ad, sending, by the user device, a fifth request for a resource associated with the URL to the ad system on the second domain; receiving, by the user device, from the ad system, second storing instructions including an ad system user ID associated with the SSP user ID; and executing, by the user device, the second storing instructions to store the ad system user ID in the ad system browser cookie associated with the second domain.

In some embodiments, the ad system browser cookie is a first-party browser cookie associated with the second domain. In some embodiments, the method includes sending, by the user device, to the first web server on the first domain, a sixth request for a second webpage; receiving, by the user device, from the first web server, the second webpage including third ad system call instructions; executing, by the user device, the third ad system call instructions to send a seventh request to the ad system on the second domain, the seventh request including the ad system user ID; and not sending, by the ad system, additional SSP call instructions in response to receiving the seventh request including the ad system user ID.

In some embodiments, the includes sending, by the user device, to the first web server on the first domain, a fifth request for a second webpage; receiving, by the user device, from the first web server, the second webpage including third ad system call instructions; executing, by the user device, the third ad system call instructions to send a sixth request to the ad system on the second domain, the sixth request including the SSP user ID; and not sending, by the ad system, additional SSP call instructions in response to receiving the sixth request including the SSP user ID. In some embodiments, determining, by the ad system, based on the second request, the user device does not store a pre-existing ad system user ID and does not store a pre-existing SSP user ID includes determining the second request does not include a pre-existing ad system browser cookie; and determining the second request does not include the pre-existing SSP user ID.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In an exemplary application of the technology, a user device running a browser requests a first webpage from a first web server on a first domain (e.g., the domain abc.com). The first webpage contains a script providing ad system call instructions. The browser executes the ad system call instructions, causing the browser to send a request to an ad system on a second domain. This request begins a process to determine a supply side platform (SSP) user ID associated with the user device and/or the browser. As is well known in the art, an SSP is a platform online publishers can use to sell advertising on their webpages and other online properties. The SSP can generate the SSP user ID and associate it with the user device/browser so that the SSP can identify the user device/browser on subsequent interactions. To facilitate this, some SSP can set a cookie associated with the SSP's domain on the user device, where the cookie contains the SSP user ID. Some SSP can associate an SSP user ID with fingerprint data identifying the user device/browser to facilitate identifying the user device/browser on subsequent interactions.

In the exemplary application, the browser receives from the ad system SSP call instructions. The browser executes the SSP call instructions, causing the browser to send a request to an SSP server on a third domain. In response to this request, the SSP server sends the browser second ad system call instructions that include the SSP user ID for the user device and/or browser. The browser then executes the second ad system call instructions, causing the browser to send a request including the SSP user ID to the ad system. Beneficially, this allows the ad system to associate the SSP user ID with its own ad system user ID for the user device and/or browser. The ad system then sends to the browser a script including instructions to store the SSP user ID as a first-party cookie on the first domain (e.g., abc.com); and the browser, executing the instruction, stores the cookie including the SSP user ID. After the cookie including the SSP user ID is set on the first domain, the ad system can use the stored SSP user ID to identify the user device and/or browser during future visits by the browser to web pages on the first domain. Beneficially, by using the SSP user ID, the ad system can also associate the user's activities across multiple domains that use the same SSP.

Environment and Systems

Figure 1:
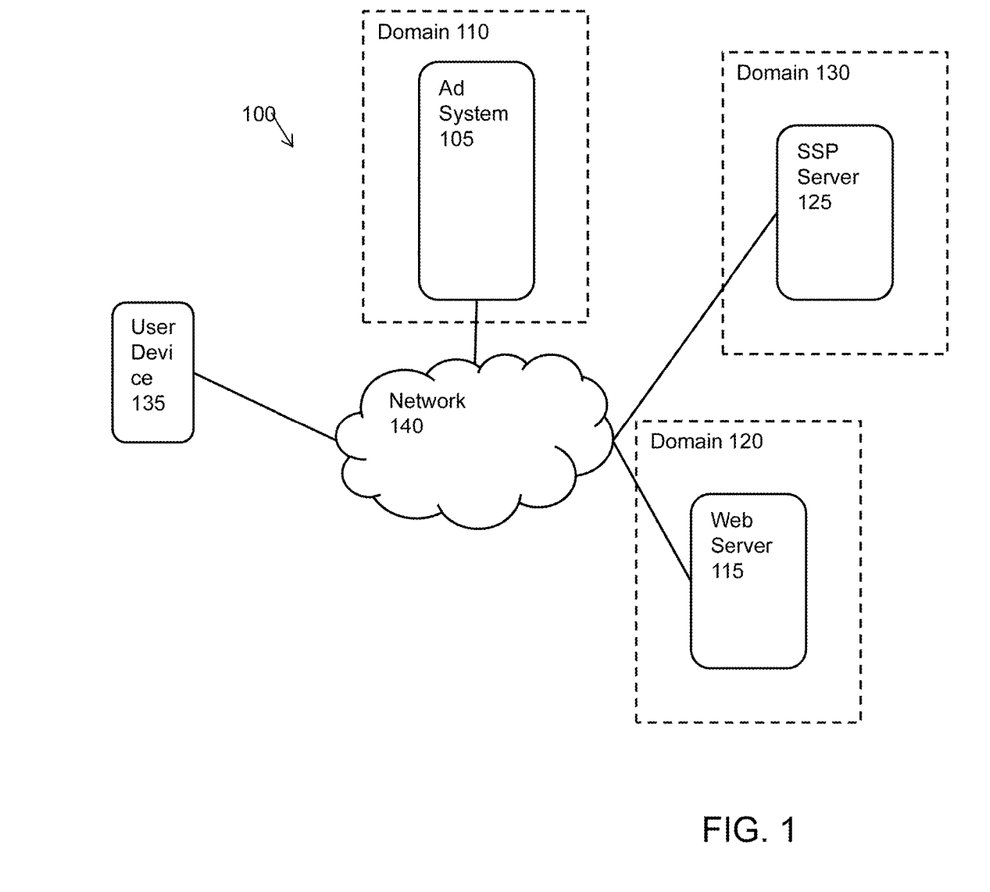
FIG. 1 is a diagram of a system in accordance with an embodiment of the technology.

FIG. 1 is a diagram of system 100 in accordance with an embodiment of the technology. As illustrated, system 100 can include ad system 105 on domain 110, web server 115 on domain 120, SSP server 125 on domain 130, and user device 135. In system 100, ad system 105, web server 115, SSP server 125, and user device 135 can be in data communication with each other via a network 140.

Ad system 105 can be any computing system comprising one or more computing devices, such as servers. Ad system 105 can be on domain 110 (e.g., domain xyz.com). Generally, a domain can refer to a set of one or more network addresses. For example, multiple computing systems can be on a domain (e.g., xyz.com) and/or its subdomains (e.g., def.xyz.com). In some embodiments, ad system 105 can collect information about users and/or devices, such as website browsing activity, online purchasing activity, and/or any other user behavior or demographic information.

Web server 115 can be any computing system comprising one or more computing devices, such as servers. Web server 115 can be on domain 120 (e.g., domain abc.com). In some embodiments, web server 115 can be provided by a merchant, vendor, or other advertiser that purchases advertising on publisher's webpages. Web server 115 and/or scripts running in webpages provided by web server 115 can provide instructions to store a cookie (e.g., an HTTP cookie) on user device 135 on domain 120. During subsequent communications between web server 115 and user device 135, web server 115 and/or scripts running in webpages provided by web server 115 can retrieve the cookie to identify user device 135. For example, the cookie can contain an ID that when provided to ad system 105, can be used to access a record of information about user device 135. SSP server 125 can be any computing system comprising one or more computing devices, such as servers. SSP server 125 can be on domain 130 (e.g., domain lmn.com). In the illustrated example, domain 110, domain 120, and domain 130 can all be different domains. User device 135 can be any computing system comprising one or more computing devices, such as personal computers, mobile devices, etc. In some embodiments, user device 135 runs a browser that interacts with ad system 105, webserver 115, and SSP server 125.

Methods for Setting Cookies

Figure 2A:
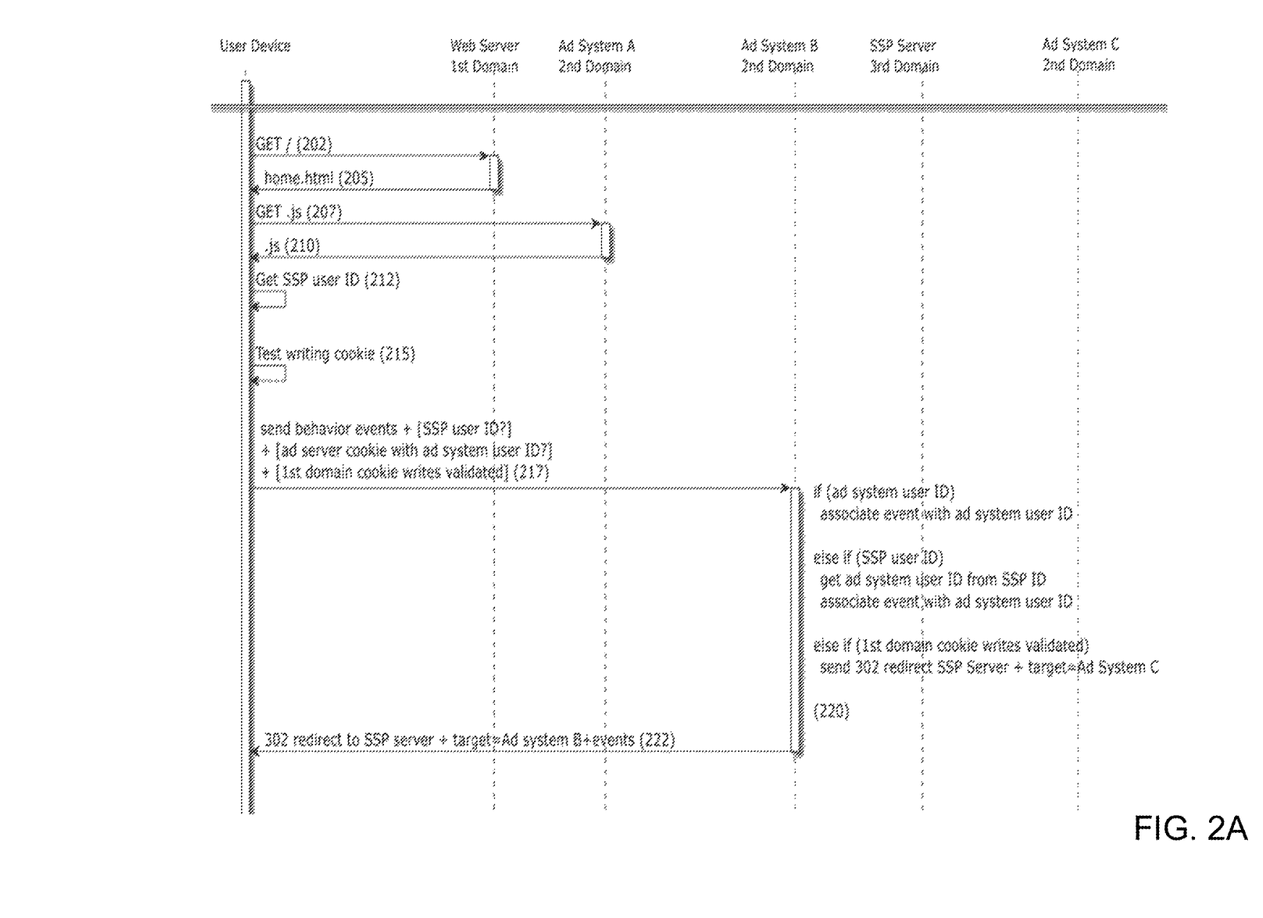
FIGS. 2A and 2B depict a flow chart of a method for setting a first party cookie in accordance with the technology.
Figure 2B:
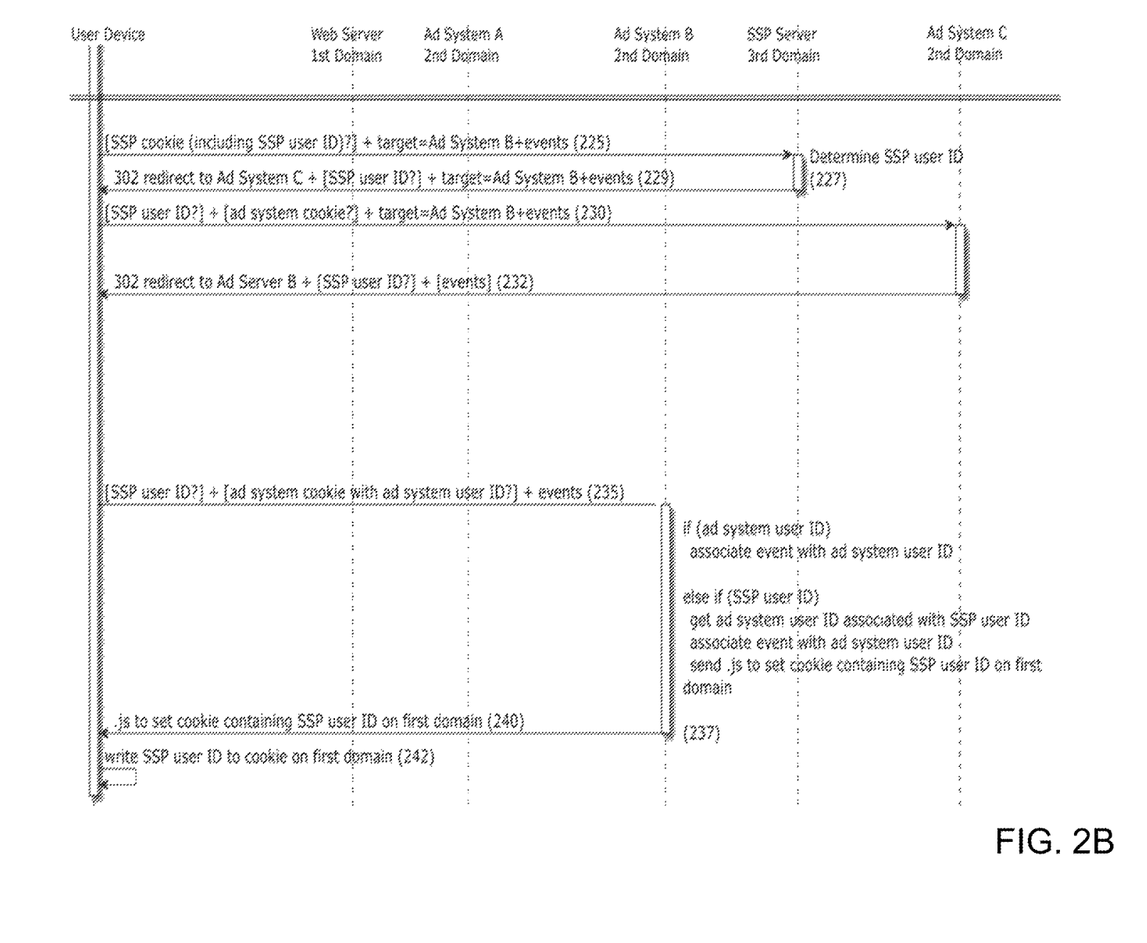

FIGS. 2A and 2B depict a flow chart of a method for setting a first party cookie in accordance with the technology. At step 202, a user device (e.g., user device 135) can send a GET command for a webpage to a first webserver on a first domain (e.g., web server 115 on domain 120). At step 205, the web server can send the webpage to the user device. The webpage can include first ad system call instructions (e.g., JavaScript instructions) that can cause the user device to send, at step 207, a GET command for a script (e.g., JavaScript) to Ad System A on the second domain. Ad system A can send the script to the user device at step 210. The script can contain instructions that can cause the user device to read, at step 212, an SSP user ID from a cookie on the first domain, if such a cookie exists. If the cookie does not exist, the script can contain instructions that can cause the user device to attempt to write, at step 215, a cookie to the first domain 120.

The script can cause the user device to send a request to Ad system B on the second domain at step 217. The request can include user behavior events; the SSP user ID, if one was read in step 212; an ad system cookie on the second domain (e.g., this can be sent automatically because Ad System B is on the second domain), if one exists; and an indication of whether a cookie was successfully written to the first domain at step 215. At step 220, Ad System B processes the request. If there is an ad system user ID in the request (e.g., in the ad system cookie), Ad System B can associate the events with the ad system user ID and the remaining steps illustrated in FIGS. 2A and 2B are not performed. If there is an SSP user ID in the request, Ad System B can determine an ad system user ID that is associated with the SSP user ID. For example, Ad System B can store associations between SSP user IDs and ad system user IDs. If there is not an ad system user ID associated with the SSP user ID, Ad System B can create an ad system user ID and store an association between the SSP user ID and the created ad system user ID. After determining the ad system user ID associated with the SSP user ID, Ad System B can associate the events with the ad system user ID and the remaining steps illustrated in FIGS. 2A and 2B are not performed. If the request includes an indication that a cookie was successfully written to the first domain at step 215 (and does not include an ad system user ID and SSP user ID), Ad System B can send, at step 222, a response including HTTP response status code 302 redirecting the user device to the SSP Server (e.g., SSP server 125) on a third domain. The response can include the URL for Ad System B as the value of a parameter (e.g., "target=Ad System B"). The response can include behavior events.

At step 225, the user device can process the HTTP response status code 302 redirecting it to the SSP server and send a request to the SSP server. The request can include an SSP cookie on the third domain containing an SSP user ID, if one is present. The request can include the URL for Ad System B as the value of a parameter (e.g., "target=Ad System B"). The request can include behavior events. At step 227, in response to receiving the request, the SSP determines an SSP user ID associated with the user device. In some embodiments, the SSP server can determine the SSP user ID by reading it from an SSP cookie in the request. In some embodiments, the SSP server can use fingerprint data from the request to determine an SSP user ID associated with the user device. At step 229, the SSP server can send a response including HTTP response status code 302 redirecting the user device to Ad System C on the second domain. The response can include the SSP user ID associated with the user device. The response can include the URL for Ad System B as the value of a parameter (e.g., "target=Ad System B"). The response can include behavior events.

At step 230, the user device can process the HTTP response status code 302 redirecting it to Ad System C and send a request to Ad System C on the second domain. The request can include the SSP user ID. The request can include an ad system cookie on the second domain (e.g., this can be sent automatically because Ad System C is on the second domain). The request can include the URL for Ad System B as the value of a parameter (e.g., "target=Ad System B"). The request can include behavior events. At step 232, Ad System C can send a response including HTTP response status code 302 redirecting the user device to Ad System B on the second domain (e.g., because the URL for Ad System B was provided as the value of the "target" parameter). The response can include the SSP user ID associated with the user device. The response can include behavior events.

At step 235, the user device can process the HTTP response status code 302 redirecting it to Ad System B and send a request to Ad System B. The request can include the SSP user ID. The request can include an ad system cookie on the second domain. The request can include behavior events. At step 237, Ad System B can process the request. If there is an ad system user ID in the request (e.g., in the ad system cookie), Ad System B can associate the events with the ad system user ID and the remaining steps illustrated in FIGS. 2A and 2B are not performed. If there is an SSP user ID in the request, Ad System B can determine an ad system user ID that is associated with the SSP user ID. For example, Ad System B can store associations between SSP user IDs and ad system user IDs. If there is not an ad system user ID associated with the SSP user ID, Ad System B can create an ad system user ID and store an association between the SSP user ID and the created ad system user ID. After determining the ad system user ID associated with the SSP user ID, Ad System B can associate the events with the ad system user ID. Ad System B can send, at step 240, to the user device, instructions (e.g., JavaScript) to set a cookie containing the SSP user ID on the first domain. At step 242, the user device can set the cookie on the first domain. The foregoing is an exemplary embodiment of the technology. It should be appreciated that variations are also contemplated. For example, two or more of Ad System A, Ad System B, and Ad System C can be the same system (e.g., Ad System 105), which can reduce the number redirections.

Figure 3:
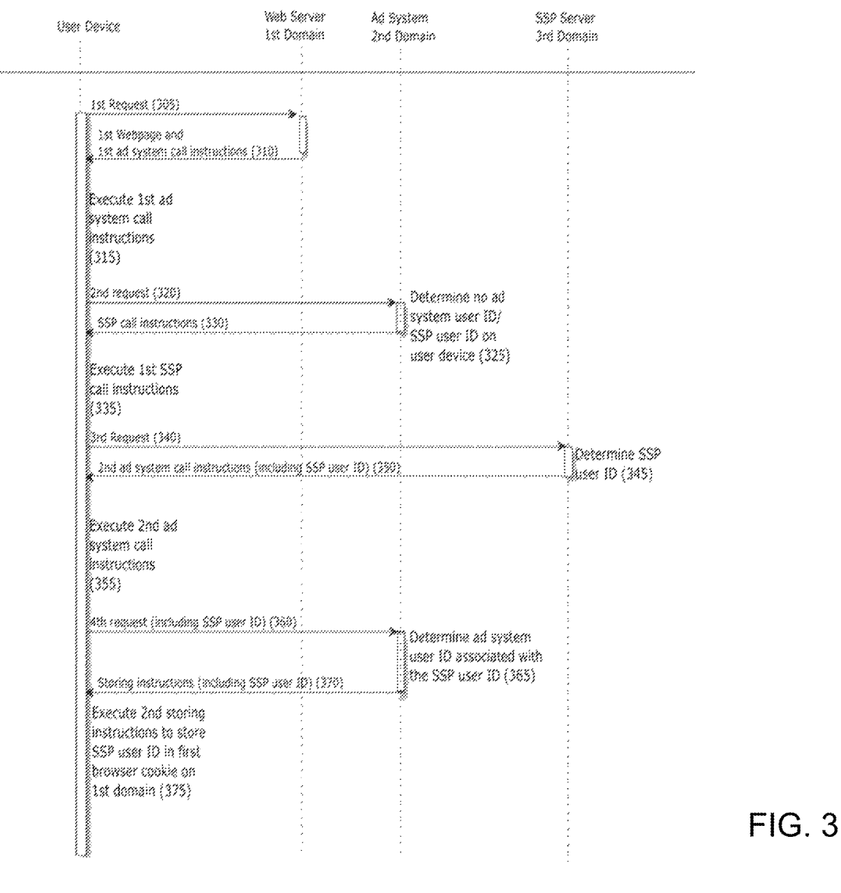
FIG. 3 depicts a flow chart of a method for setting a first party cookie in accordance with the technology.

FIG. 3 depicts a flow chart of a method for setting a first party cookie in accordance with the technology. At step 305, the user device (e.g., user device 135) can send, to a first web server on a first domain, a first request for a first webpage (e.g., as described in step 202 above). At step 310, the first web server can send, to the user device, the first webpage comprising first ad system call instructions (e.g., as described in step 205 above). At step 315, the user device can execute the first ad system call instructions (e.g., as described in steps 207-215 above). The user device can execute the first ad system call instructions to send, at step 320, a second request to an ad system on a second domain to initiate determining a supply side platform (SSP) user ID (e.g., as described in step 217 above). At step 325, the Ad System (e.g., ad system 105) can determine, based on the second request, the user device does not store a pre-existing ad system user ID and does not store a pre-existing SSP user ID (e.g., as described in step 220 above). At step 330, the ad system can send, to the user device, first SSP call instructions (e.g., as described in step 222 above). At step 335, the user device can execute the first SSP call instructions to send, at step 340, a third request to an SSP server on a third domain (e.g., as described in step 225 above). At step 345, the SSP server can determine an SSP user ID associated with the user device (e.g., as described in step 227 above). At step 350, the SSP server can send, to the user device, second ad system call instructions, the second ad system call instructions including the SSP user ID (e.g., as described in step 229 above). At step 355, the user device can execute the second ad system call instructions (e.g., as described in steps 230-235 above). The user device can execute the second ad system call instructions to send, at step 360, a fourth request to the ad system, the fourth request including the SSP user ID (e.g., as described in step 235 above). At step 365, the ad system can determine an ad system user ID associated with the SSP user ID (e.g., as described in step 237 above). At step 370, the ad system can send, to the user device, storing instructions comprising the SSP user ID (e.g., as described in step 240 above). At step 375, the user device can execute the storing instructions to store the SSP user ID in a first browser cookie associated with the first domain (e.g., as described in step 240 above).

Beneficially, the user device can visit a publisher site that uses the SSP. When loading a publisher page, the user device can send a first ad request for a first ad that includes the SSP user ID. The user device can receive the first ad comprising a target URL on the second domain. In response to an interaction with the first ad, the user device can send a fifth request for a resource associated with the URL to the ad system on the second domain. The user device can receive from the ad system second storing instructions including an ad system user ID associated with the SSP user ID. The user device can execute the second storing instructions to store the ad system user ID in an ad system browser cookie associated with the second domain. In this exemplary embodiment, the ad system browser cookie is a first-party cookie.

Some embodiments of the technology are described above with reference to webpages. It should be appreciated that the technology can be applied to selecting and/or providing advertisements for any digital asset that includes one or more impression opportunities. Digital assets can include webpages, multi-media items, applications, etc. As an example, the technology can be applied to selecting and/or providing advertisements for display in impression opportunities in an application (e.g., an application on a personal computer, an application on a mobile computing device, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method performed by a user device, the method comprising:
    sending, by the user device, to a first web server on a first domain, a first request for a first webpage;
    receiving, by the user device, from the first web server, the first webpage comprising first ad system call instructions that include a target URL on a second domain;
    determining, by the user device, whether a first browser cookie can be set on the first domain;
    executing, by the user device, the first ad system call instructions to send a second request using the target URL on the second domain to an ad system on second domain, the second request comprising an indicator of whether the first browser cookie can be set on the first domain;
    receiving, by the user device, from the ad system, first SSP call instructions that include a URL on a third domain, the target URL on the second domain, and the indicator of whether the first cookie can be set on the first domain;

executing, by the user device, the first SSP call instructions to send a third request using the URL on the third domain to an SSP server on the third domain, the third request comprising the target URL on the second domain, the SSP server determining an SSP user ID associated with the user device based upon the third request;

receiving, by the user device, from the SSP server, second ad system call instructions, the second ad system call instructions comprising the SSP user ID and the target URL on the second domain;

executing, by the user device, the second ad system call instructions using the target URL on the second domain to send a fourth request comprising the SSP user ID to the ad system;

receiving, by the user device, from the ad system, first storing instructions comprising the SSP user ID;

executing, by the user device, the first storing instructions to store the SSP user ID in the first browser cookie on the first domain.

2. The method of claim 1, wherein the third request comprises at least one of an SSP browser cookie comprising the SSP user ID and fingerprint data associated with the user device.

3. The method of claim 1, further comprising:
sending, by the user device, a first ad request for a first ad, the first ad request comprising the SSP user ID;
receiving, by the user device, a first ad comprising a target URL on the second domain;
in response to a user interaction with the first ad, sending, by the user device, a fifth request for a resource associated with the URL to the ad system on the second domain;
receiving, by the user device, from the ad system, second storing instructions comprising an ad system user ID associated with the SSP user ID;
executing, by the user device, the second storing instructions to store the ad system user ID in an ad system browser cookie associated with the second domain.

4. The method of claim 3, wherein the ad system browser cookie is a first-party browser cookie associated with the second domain.

5. The method of claim 3, further comprising:
sending, by the user device, to the first web server on the first domain, a sixth request for a second webpage;
receiving, by the user device, from the first web server, the second webpage comprising third ad system call instructions; and
executing, by the user device, the third ad system call instructions to send a seventh request to the ad system on the second domain, the seventh request comprising the ad system user ID.

6. The method of claim 1, further comprising:
sending, by the user device, to the first web server on the first domain, a fifth request for a second webpage;
receiving, by the user device, from the first web server, the second webpage comprising third ad system call instructions; and
executing, by the user device, the third ad system call instructions to send a sixth request to the ad system on the second domain, the sixth request comprising the SSP user ID.

7. A method performed by a computing system, the method comprising:

sending, by a user device, to a first web server on a first domain, a first request for a first webpage;

sending, by the first web server, to the user device, the first webpage comprising first ad system call instructions that include a target URL on a second domain;

determining, by the user device, whether a first browser cookie can be set on the first domain;

executing, by the user device, the first ad system call instructions to send a second request using the target URL on the second domain to an ad system on the second domain, the second request comprising an indicator of whether the first browser cookie can be set on the first domain;

determining, by the ad system, based on the second request, the user device does not store a pre-existing ad system user ID and does not store a pre-existing SSP user ID;

sending, by the ad system, to the user device, first SSP call instructions that include a URL on a third domain, the target URL on the second domain, and the indicator of whether the first browser cookie can be set on the first domain;

executing, by the user device, the first SSP call instructions to send a third request using the URL on the third domain to an SSP server on the third domain, the third request comprising the target URL on the second domain, the SSP server determining an SSP user ID associated with the user device based upon the third request;

sending, by the SSP server, to the user device, second ad system call instructions, the second ad system call instructions comprising the SSP user ID and the target URL on the second domain;

executing, by the user device, the second ad system call instructions using the target URL on the second domain to send a fourth request to the ad system, the fourth request comprising the SSP user ID;

determining, by the ad system, an ad system user ID associated with the SSP user ID;

sending, by the ad system, to the user device, storing instructions comprising the SSP user ID; and executing, by the user device, the storing instructions to store the SSP user ID in the first browser cookie on the first domain.

8. The method of claim 7, wherein the third request comprises at least one of an SSP browser cookie comprising the SSP user ID and fingerprint data associated with the user device.

9. The method of claim 7, wherein determining, by the ad system, an ad system user ID comprises:
generating, by the ad system, an ad system user ID; and
associating, by the ad system, the ad system user ID with the SSP user ID.

10. The method of claim 7, wherein determining, by the ad system, an ad system user ID comprises:
retrieving, by the ad system, an associated ad system user ID associated with the SSP user ID.

11. The method of claim 7, wherein the fourth request further comprises one or more user behavior events, the method further comprising:
associating, by the ad system, the one or more user behavior events with the ad system user ID.

12. The method of claim 7, further comprising:
sending, by the user device, a first ad request for a first ad, the first ad request comprising the SSP user ID; and
receiving, by the user device, a first ad comprising a target URL on the second domain.

13. The method of claim 12, wherein the ad system selects the first ad based on a plurality of user behavior events associated with the ad system user ID.

14. The method of claim 12, further comprising:
in response to an interaction with the first ad, sending, by the user device, a fifth request for a resource associated with the URL to the ad system on the second domain;
receiving, by the user device, from the ad system, second storing instructions comprising an ad system user ID associated with the SSP user ID;
executing, by the user device, the second storing instructions to store the ad system user ID in an ad system browser cookie associated with the second domain.

15. The method of claim 14, wherein the ad system browser cookie is a first-party browser cookie associated with the second domain.

16. The method of claim 14, further comprising:
sending, by the user device, to the first web server on the first domain, a sixth request for a second webpage;
receiving, by the user device, from the first web server, the second webpage comprising third ad system call instructions;
executing, by the user device, the third ad system call instructions to send a seventh request to the ad system on the second domain, the seventh request comprising the ad system user ID; and
not sending, by the ad system, additional SSP call instructions in response to receiving the seventh request comprising the ad system user ID.

17. The method of claim 7, further comprising:
sending, by the user device, to the first web server on the first domain, a fifth request for a second webpage;
receiving, by the user device, from the first web server, the second webpage comprising third ad system call instructions;
executing, by the user device, the third ad system call instructions to send a sixth request to the ad system on the second domain, the sixth request comprising the SSP user ID; and
not sending, by the ad system, additional SSP call instructions in response to receiving the sixth request comprising the SSP user ID.

18. The method of claim 7, wherein determining, by the ad system, based on the second request, the user device does not store a pre-existing ad system user ID and does not store a pre-existing SSP user ID comprises:
determining the second request does not comprise a pre-existing ad system browser cookie; and
determining the second request does not comprise the pre-existing SSP user ID.

* * * * *